United States Patent [19]
Fiser et al.

[11] 3,794,081
[45] Feb. 26, 1974

[54] FIBER REINFORCED TUBULAR ARTICLE HAVING ABRASION RESISTANT LINER

[75] Inventors: James T. Fiser; Robert M. Jackman; Ray R. James, all of Little Rock, Ark.

[73] Assignee: A. O. Smith-Inland Inc., Milwaukee, Wis.

[22] Filed: May 5, 1972

[21] Appl. No.: 250,767

[52] U.S. Cl. ............................. 138/141, 138/153
[51] Int. Cl. ............................................ F16l 9/04
[58] Field of Search ... 138/140, 141, 145, 146, 153, 138/DIG. 2

[56] References Cited
UNITED STATES PATENTS
3,633,631 1/1972 Hatch ............................... 138/141
2,614,058 10/1952 Francis .......................... 138/141 X
2,843,646 7/1958 Conant .......................... 138/145 X Primary Examiner—Jerry W. Myracle
Attorney, Agent, or Firm—Andrus, Sceales, Starke & Sawall

[57] ABSTRACT

A tubular article having an internal abrasion and corrosion resistant liner and a method of forming the same provides an inner layer of cheesecloth impregnated with an epoxy resin with the resin adapted to form an outer layer on the cheesecloth. A layer including a plurality of ceramic spheres each having at least a partial surface coating of metal are secured to the cheesecloth through the bonding provided by the metal coating and resin and are maintained in a confined condition to form the inner liner, such as by an outer layer of cheesecloth impregnated with an epoxy resin which surrounds the layer of ceramic spheres and resin. A plurality of fiber glass filaments impregnated with thermosetting resin surround the inner liner with the entire composite cured to form the fiber reinforced pipe.

3 Claims, 3 Drawing Figures

PATENTED FEB 26 1974 3,794,081

FIBER REINFORCED TUBULAR ARTICLE HAVING ABRASION RESISTANT LINER

BACKGROUND OF THE INVENTION

This invention relates to a tubular article having an inner liner which is resistant to abrasion, corrosion and erosion and to a method of making the same.

Severe abrasion, erosion and corrosion problems have been experienced in conduits or pipes which conduct abrasive materials such as rock or metal ores either in dry or slurry form. Thus, many of the commercialy avaiable abrasion resistant pipes provides a very thick wall consisting of steel, iron, or iron alloy which is extremely heavy. The pipe weight has been somewhat reduced by providing a rubber or plastic liner within a thin-walled steel or iron pipe to resist corrosion. Such liners have not always adequately bonded to the steel or iron used in such pipes and acidic slurries have in some installations penetrated the bond to corrode the steel or iron. Also, sharp abrasive elements tend to cut or slash the rubber or plastic liner thereby allowing the metal to corrode. In any event, metal pipes used for conducting abrasive elements have been excessively heavy and difficult to transport and install.

Fiber reinforced plastic pipes commonly formed by winding suitable filaments such as glass impregnated with a curable resinous material such as an epoxy or polyester resin on a removable mandrel are light in weight and offer a strong resistance to corrosion. Many of such commercially available reinforced plastic pipes, however, have been readily abraded when used to conduct highly abrasive materials whether in dry or slurry form.

Ceramic particles have recently been utilized to line various surfaces to effectively resist abrasion by elements coming into contact therewith. The placement of such ceramic particles on the inner surface of reinforced plastic pipes has heretofore been found to be extremely difficult, time consuming and expensive.

SUMMARY OF INVENTION

This invention relates to a tubular article having an inner liner which is resistnat to abrasion, corrosion and erosion and to a method of making the same.

A method of making or fabricating a fiber reinforced thermosetting tubular article having an abrasion and corrosion resistnat liner is provided which greatly simplifies the placement of abrasion resistant particles into the inner liner in an economical manner. Specifically, the novel method of forming the tubular article includes the steps of applying a fibrous material impregnated with an uncured resin to a supporting surface, applying abrasion resistant particles to the fibrous material, maintaining the resin and particles in a confined tubular condition to form the inner liner, applying fibrous filaments impregnated with a thermosetting resin over the confined resin and particles, and curing the entire composite to form the tubular article.

A mandrel is utilized to provide a supporting surface upon which a mold releasing agent is applied. A fibrous material is throughly wetted with a resin and wrapped about the mandrel supporting surface to squeeze a portion of the resin to the outer or exposed surface of the fibrous material. Abrasion resistant particles are sprinkled on the fibrous material and resin with the excess particles being removed by the rotation of the fibrous material while the remaining attached abrasion resistant particles thoroughly wet out. A second group of abrasion resistant particles is applied to the fibrous material and resin to insure a uniform and relatively thick layer of particles. The resin and particles are maintained in a confined condition by the application of a second fibrous material also impregnated with a resin to complete the liner. Fibrous filaments impregnated with a thermosetting resin are applied about the liner with the entire composite cured to form a fiber reinforced tubular article having an abrasion and corrosion resistant liner.

The above method of construction forms a novel tubular article which provides an internal abrasion resistant liner having an inner layer of fibrous material impregnated with a resin and forming the inner surface of the tube, a layer providing a plurality of abrasion resistant particles and resin secured to the fibrous material by the bonding provided by the resin, an outer layer of fibrous material impregnated with a resin surrounding the layer of abrasion resistant particles, and a plurality of fibrous filaments impregnated with a thermosetting resin surrounding the outer fibrous layer.

Applicants have found that cheesecloth provides a very desirable fibrous material which can be readily utilized with a high viscosity resin having a viscosity range of 2,000 to 20,000 centipoise such as an epoxy resin to secure the layer of abrasion resistant particles. Employment of ceramic spheres each having at least a partial surface coating of metal adapted to adhere to the resin has been found to be highly desirable.

BRIEF DESCRIPTION OF THE DRAWING

The drawing furnished herewith illustrates the best mode presently contemplated by the inventors and clearly discloses the above advantages and features as well as others which will be readily understood from the detailed description thereof.

In the drawing.

DESCRIPTION OF THE PREFERRED ILLUSTRATED EMBODIMENT

Figure 1:
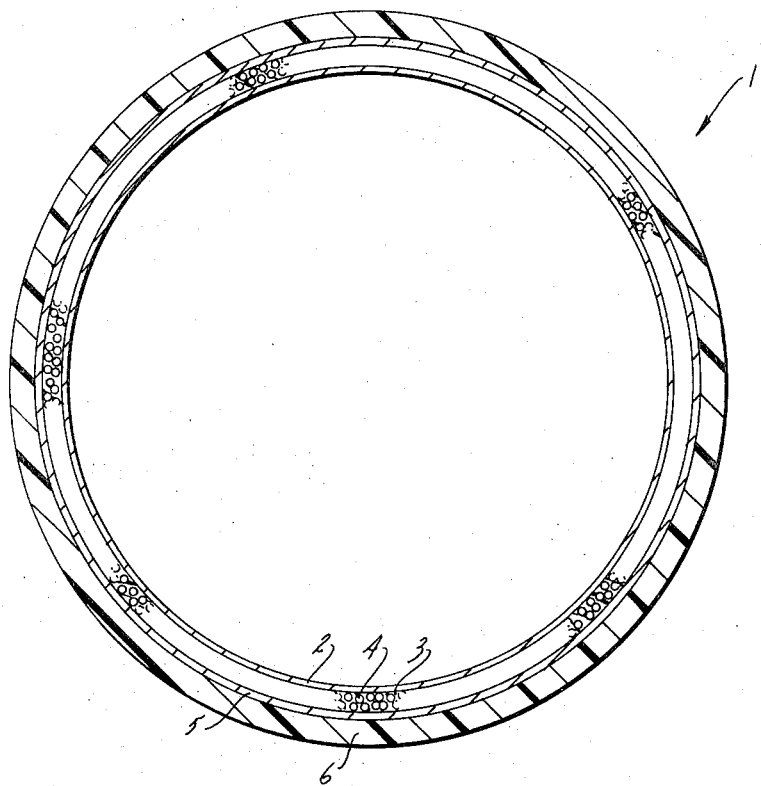
FIG. 1 is an axial end view of a fiber reinforced pipe having an internal abrasion resistant liner.

The present invention is directed to a method of making a fiber reinforced tubular article or pipe having an inner liner which is resistant to abrasion, erosion and corrosion. A pipe forming mandrel is utilized to provide a circumferential supporting surface upon which a conventional mold releasing agent is applied in the customary manner of forming fiber reinforced pipes. A fibrous material, such as cheesecloth, is thoroughly wet with a high viscosity resin such as an epoxy resin and is wrapped or applied securely about the mandrel supporting surface so as to squeeze a portion of the resin to the outer circumferential surface thereby forming an outer layer of resin about the cheesecloth.

Abrasion resistant particles, such as spherical ceramic particles each having at least a partial surface coating of metal adapted to adhere to the resin, are sprinkled onto the epoxy resin surface and are secured to the cheesecloth by the adhesive bonding provided by the resin. The supporting surface of the mandrel is rotated to allow excess abrasion resistant particles to drop off and to permit a thorough wetting of the adhered particles. A second layer of abrasion resistant particles is applied to the resin layer to insure a uniform and relatively thick layer of particles.

The resin and abrasion resistant particles are secured and compacted to the inner layer of cheesecloth and to the pipe forming mandrel by the application of a second cheesecloth impregnated with a high viscosity epoxy resin about the layers of resin and particles.

The layers of abrasion resistant particles and resin which are maintained in a confined condition between the two layers of fibrous material, such as cheesecloth, thus provide a highly desirable inner liner for use in a fiber reinforced pipe. Thus, fiber glass filaments which are impregnated with a thermosetting resin are wound about the second or outer layer of cheesecloth in a manner well known to those skilled in the art, followed by the customary curing of the entire pipe.

The pipe constructed in accordance with the above described steps thus provides an inner liner which is highly resistant to abrasive elements, either in a slurry or dry form. The innermost layer of fibrous material, such as cheesecloth, gradually dissipates in use with a highly abrasive material while the abrasion resistant particles remain to provide continued resistance to the abrasive use.

Although cheesecloth is the preferred form of fibrous material, various fabrics or cellulose types of material could be utilized. Thus, porous paper, spun mat, glass mat, and even coatable plastic film can be utilized as the fibrous material to form a tubular article or pipe in accordance with the invention. Also, while an epxoy type of resin is preferred, urethane resin, polyesters, elastomeric materials and polymerizable materials of other types may be utilized to impregnate the fibrous materials and/or form a resinous layer.

A sintered aluminum oxide base ceramic has been found highly desirable for use as an abrasion resistant particle with the invention while beryllium oxide base ceramics and zirconium oxide base ceramics could also be used. Generally, any ceramic particle made from particularly hard high temperature materials such as alumina, beryl, silica, nitride or silicon carbide, for example, could be used. In addition, glass beads, quartz, mica, metal particles or any other abrasion resistant particle may be used provided a good bond can be obtained with the resin. The aluminum oxide base ceramic, however, is preferred because of its extreme hardness and wear-resistance and because it is relatively tough and scratch-resistant as compared with other ceramics.

A metal coating covering at least a portion of each abrasion resistant particle may advantageously be employed to increase the bonding between the resin and the particles. Specifically, a coating of lithium molybdate has been found to provide a very desirable bond between the particles and the resin. A number of metal coatings, however, could be employed such as molybdenum, titanium, zirconium, aluminum, copper, iron, tin, zinc, magnesium, brass or steel or alloys thereof, for example. Molybdenum, titanium and zirconium are preferred because of their good bonding ability with resins.

Various shapes and sizes of the abrasion resistant particles can be utilized including spherical particles, irregular chips, and various other granules, flakes or the like. Spherical particles are particularly desirable because of their ability to be strongly bonded to the resin and because they provide a mechanical lock with the liner composite should the resin-particle bond fail, thereby permitting continued resistance to abrasion instead of disengaging from the liner.

The application of the inner fibrous material is important for holding a uniform coating or layer of resin upon the mandrel supporting surface so that a uniform and relatively thick layer of abrasion resistant particles are retained. Generally, a cheesecloth in the range of approximately five to ten-thousands of an inch in thickness is capable of holding a sufficient amount of viscous resin to retain a layer of resin and particles of approximately one-tenth of an inch in thickness. In addition, the inner fibrous material acts as a protective layer to the supporting surface of the pipe forming mandrel and prevents scoring and gouging of the mandrel surface by the hand abrasion resistant particles. Also, the inner fibrous material allows the completed pipe to be readily removed from the pipe forming mandrel and greatly increases the mandrel life. The inner fibrous material also is highly effective for peventing the abrasion resistant particles and resin from shifting or sliding on the smooth mandrel surface during the steps of fabrication. The inner fibrous material thus insures a continuous circumferential application of abrasion resistant particles and resin within the internal liner to completely protect the outer layers of fiber glass when in use with highly abrasive materials. In addition, utilization of the inner fibrous material prevents cratering or uneven distribution of the resin layer by the operation of the mold releasing agent which is applied to the mandrel supporting surface.

The viscosity of the resin applied to the fibrous material is important because a low viscosity resin will not attract and secure a sufficient number of abrasion resistant particles while an excessively high viscosity resin will attract an excessive amount of particles which will shift or slide upon the supporting surface and provide a liner having an irregular thickness. Generally, a resin having a viscosity range between 2,000 and 20,000 centipose is utilized with the resin being selected in accordance with the type of abrasion resistant particles utilized.

The outer layer of fibrous material allows the application of an over-wrap of fiber glass filaments to be directly wound about the formed liner without the necessity of partially or fully curing the liner. Specifically, the outer layer of fibrous material prevents the fiber glass filaments from embedding into the layers of abrasion resistant particles and resin by the tension applied to the filaments during the conventional winding process. Although an intermediate curing step might be used within applicant's invention, it is preferred to eliminate such an intermediate curing operation and hold the particles in a secured position by the application of the outer fibrous material. Thus, curing of the entire tubular composite in one step substantially reduces the possibility of delamination occurring between the liner and the over-wrap due to different rates of thermal expansion and contraction which might otherwise occur.

Figure 2:
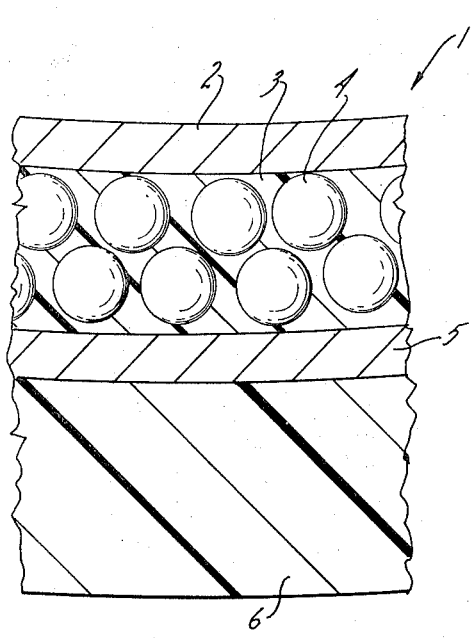
FIG. 2 is an enlarged sectional view of the pipe wall shown in FIG. 1.

With reference to FIGS. 1 and 2, a fiber reinforced tubular article or pipe 1 is constructed in accordance with applicant's method. Specifically, an inner layer of cheesecloth 2 is impregnated with an epoxy resin which forms an outer layer of epoxy resin 3. A layer of a plurality of abrasion resistant spheres 4 having a surface coating of metal adapted to adhere to the resin is secured to the cheesecloth 2 by the bonding provided by the resin 3. An outer layer of cheesecloth 5 impregnated with an epoxy resin surrounds the layer of spheres 4 and resin 3. Finally, a plurality of fiber glass filaments 6 impregnated with a thermosetting resin surround the outer layer of cheesecloth 5. The fiber reinforced pipe 1 shown in FIGS 1 and 2 thus provides a highly abrasion and corrosion resistant inner liner.

Figure 3:
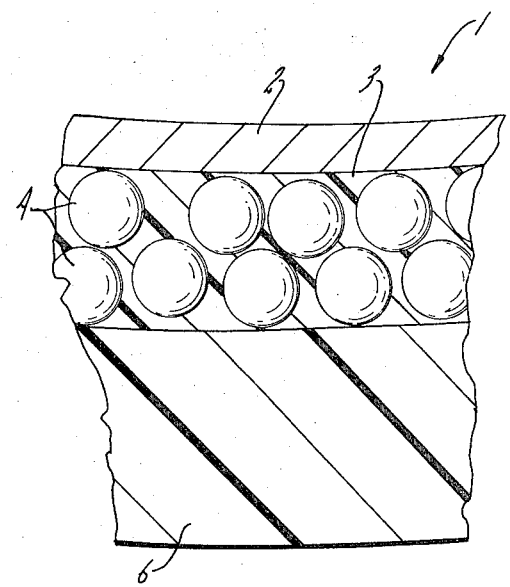
FIG. 3 is an enlarged sectional view of another embodiment of a wall portion of a fiber reinforced pipe.

With reference to FIG. 3, a fiber reinforced pipe is shown in which the layer of spheres 4 and resin 3 had been retained during fabrication in a confined condition by an intermediate partial curing step rather than by an outer layer of cheesecloth as preferred.

The employment of abrasion resistant spherical particles within a liner as set forth by the applicants thus provides a light weight fiber reinforced tubular article or pipe which permits a substantially longer use with abrasive materials. In controlled tests, particles of sintered aluminum oxide base ceramic resisted abrasion approximately 20 times longer than steel particles and from approximately five to 10 times longer than special high chromium alloy particles. In field tests, applicant's pipe has lasted from approximately two to 10 times longer than steel and chromium type pipes. Similar tests show that applicant's pipe has lasted approximately from 50 to 500 times longer than non-lined filament would fiber glass pipe. Furthermore, applicant's pipe weighs from approximately five to 10 times less than abrasion resistant iron or iron alloy pipe.

The present invention thus provides a highly satisfactory and economical method of fabricating a fiber reinforced tubular article or pipe having an abrasion resistant inner liner for use with highly abrasive and corrosive materials.

Various modes of carrying out the invention are contemplated as being within the scope of the following claims particularly pointing out and distinctly claiming the subject matter which is regarded as the invention.

We claim:

1. A tubular article having an inner abrasion resistant lining including
   an inner layer of fibrous material impregnated with resin and forming the inner surface of the tube,
   a layer providing a plurality of abrasion resistant particles and resin secured to said fibrous material by the bonding provided by said resin,
   an outer layer of fibrous material impregnated with a resin surrounding said layer of abrasion resistant particles, and
   a plurality of fibrous filaments impregnated with a thermosetting resin surrounding said particles for providing a highly abrasive resistant tubular article when cured.

2. The tubular article of claim 1, wherein said fibrous material includes cheesecloth.

3. A tubular article having an inner abrasion resistant liner including
   a first layer of cheesecloth impregnated with an epoxy resin forming the inner surface of the tubular article,
   a layer having a plurality of ceramic spheres having at least a partial surface coating of metal bonded to said cheesecloth by said epoxy resin,
   a second layer of cheesecloth impregnated with an epoxy resin surrounding and confining said layer of ceramic spheres, and
   a plurality of fiber glass filaments impregnated with thermosetting resin surrounding said second layer of cheesecloth for providing a highly abrasion and corrosion resistant tubular article when cured.

* * * * *